United States Patent
Marquardt et al.

(10) Patent No.: US 10,019,281 B2
(45) Date of Patent: *Jul. 10, 2018

(54) HANDOFF OF VIRTUAL MACHINES BASED ON SECURITY REQUIREMENTS

(71) Applicant: Sprint Communications Company L.P., Overland Park, KS (US)

(72) Inventors: Ronald R. Marquardt, Woodinville, WA (US); Lyle Walter Paczkowski, Mission Hills, KS (US); Arun Rajagopal, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 222 days.

This patent is subject to a terminal disclaimer.

(21) Appl. No.: 15/184,046

(22) Filed: Jun. 16, 2016

(65) Prior Publication Data

US 2016/0350150 A1 Dec. 1, 2016

Related U.S. Application Data

(63) Continuation of application No. 14/722,801, filed on May 27, 2015, now Pat. No. 9,396,016.

(51) Int. Cl.
*G06F 9/46* (2006.01)
*G06F 9/455* (2018.01)

(52) U.S. Cl.
CPC .. *G06F 9/45558* (2013.01); *G06F 2009/4557* (2013.01); *G06F 2009/45587* (2013.01); *G06F 2009/45595* (2013.01)

(58) Field of Classification Search
CPC .................................................. G06F 9/45558

(Continued)

(56) References Cited

U.S. PATENT DOCUMENTS 7,484,208 B1 * 1/2009 Nelson ............... G06F 9/45558
711/6
7,512,769 B1 * 3/2009 Lowell .................... G06F 9/461
711/165

(Continued)

OTHER PUBLICATIONS

Zhao, Ming, and Renato J. Figueiredo. "Experimental study of virtual machine migration in support of reservation of cluster resources." Proceedings of the 2nd international workshop on Virtualization technology in distributed computing. ACM, 2007.pp. 1-8.*

(Continued)

*Primary Examiner* — Satish Rampuria

(57) ABSTRACT

A computer system transitions a virtual machine from a host computer to a target computer having a security key. The host computer transfers a security phrase to the target computer. The target computer applies the security key to the security phrase to generate a security response. That target computer transfers the security response to the host computer. The host computer determines whether the target computer can support the virtual machine based on the security response from the target computer. If the target computer is capable of supporting the virtual machine, then the host computer initiates a transition of the virtual machine from the host computer to the target computer. The determination of whether the target computer can support the virtual machine may be further based on resource availability, time-slice availability, and the other virtual machines executing on the target computer.

16 Claims, 6 Drawing Sheets

(58) Field of Classification Search
USPC .................................................. 718/1–108
See application file for complete search history.

(56) References Cited

U.S. PATENT DOCUMENTS

| | | | |
|---|---|---|---|
| 8,050,409 B2 | 11/2011 | Agrawal et al. | |
| 8,135,937 B2 | 3/2012 | Hall et al. | |
| 8,494,576 B1 | 7/2013 | Bye et al. | |
| 8,504,097 B1 | 8/2013 | Cope et al. | |
| 8,649,770 B1 | 2/2014 | Cope et al. | |
| 8,667,607 B2 | 3/2014 | Paczkowski et al. | |
| 8,752,160 B1 | 6/2014 | Delker et al. | |
| 8,819,447 B2 | 8/2014 | Shipley et al. | |
| 2009/0037680 A1* | 2/2009 | Colbert | G06F 3/0617 711/162 |
| 2009/0144393 A1* | 6/2009 | Kudo | G06F 9/5044 709/218 |
| 2010/0311401 A1 | 12/2010 | Oh et al. | |
| 2012/0042034 A1* | 2/2012 | Goggin | G06F 9/4856 709/216 |
| 2013/0322443 A1 | 12/2013 | Dunbar et al. | |
| 2013/0345530 A1 | 12/2013 | McRoberts et al. | |
| 2014/0047548 A1 | 2/2014 | Bye et al. | |
| 2014/0181267 A1 | 6/2014 | Wadkins et al. | |
| 2014/0201374 A1 | 7/2014 | Ashwood-Smith et al. | |
| 2014/0229945 A1 | 8/2014 | Barkai et al. | |
| 2014/0241247 A1 | 8/2014 | Kempf et al. | |
| 2014/0259012 A1 | 9/2014 | Nandlall et al. | |

OTHER PUBLICATIONS

Hines, Michael R., and Kartik Gopalan. "Post-copy based live virtual machine migration using adaptive pre-paging and dynamic self-ballooning." Proceedings of the 2009 ACM SIGPLAN/SIGOPS international conference on Virtual execution environments. ACM, 2009.pp. 51-60.*

Shrivastava, Vivek, et al. "Application-aware virtual machine migration in data centers." INFOCOM, 2011 Proceedings IEEE. IEEE, 2011.pp. 66-70.*

Wei Huang, et al.; "High Performance Virtual Machine Migration with RDMA over Modern Interconnects;" 2007 IEEE International Conference on Cluster Computing; 2007; pp. 11-20; IEEE.

Ezra Silvera, et al.; "IP Mobility to Support Live Migration of Virtual Machines Across Subnets;" Proceedings of SYSTOR 2009: The Israeli Experimental Systems Conference; 2009; pp. 1-10.

Hidenobu Watanabe, et al.; "A Performance Improvement Method for the Global Live Migration of Virtual Machine with IP Mobility;" Proceedings of the Fifth International Conference on Mobile Computing and Ubiquitous Networking (ICMU 2010); 2010; pp. 1-6; vol. 94.

* cited by examiner

DATA STRUCTURE 400

| VIRTUAL MACHINES 410 | TRUST REQUIREMENT 420 | TRUST REQUIREMENT 421 |
|---|---|---|
| VM 411 | REQUIREMENT 431 | REQUIREMENT 435 |
| VM 412 | REQUIREMENT 432 | REQUIREMENT 436 |
| VM 413 | REQUIREMENT 433 | REQUIREMENT 437 |
| VM 414 | REQUIREMENT 434 | REQUIREMENT 438 |

FIGURE 4

HANDOFF OF VIRTUAL MACHINES BASED ON SECURITY REQUIREMENTS

RELATED CASES

This patent application is a continuation of U.S. patent application Ser. No. 14/722,801 that was filed on May 27, 2015 and is entitled "HANDOFF OF VIRTUAL MACHINES BASED ON SECURITY REQUIREMENTS." U.S. patent application Ser. No. 14/722,801 is hereby incorporated by reference into this patent application.

TECHNICAL BACKGROUND

A virtual machine is a software implementation of a computer that includes its own guest operating system to execute one or more applications and processes. A host computing system allocates a certain amount of its resources to each of the virtual machines, and multiplexes the underlying hardware platform among the virtual machines. Each virtual machine is then able to use the allocated resources, such as processing cycles, memory, and the like to execute its own guest operating system and applications. The software layer providing the virtualization is commonly referred to as a hypervisor, which abstracts the underlying hardware of the host computer and provides the abstracted hardware to each of the individual virtual machines.

During execution of the virtual machines on the host computing systems, virtual machines may require a handoff from a first hypervisor to a second hypervisor to provide the proper operations. This handoff requirement may occur as a result of updates to a host computing system, updates to a hypervisor on a host computing system, a new host computing system becoming available for the virtual machine, or any other reason.

In some implementations, virtual machines may be distributed across multiple host computing systems and hypervisors to provide various data services. These virtual machines, sometimes referred to as virtual network elements, forward data packets for the data services, wherein the different data services are associated with a particular subset of virtual network elements. For example, a first set of virtual network elements may be associated with a first data service, while a second set of virtual network elements are associated with a second data service. These network elements include, but are not limited to, a: Mobility Management Entity (MME), Service Gateway (S-GW), Packet Data Network Gateway (P-GW), Policy Charging and Rules Function (PCRF), Home Subscriber System (HSS), Baseband Processing Unit (BBU), Radio Resource Control (RRC) processor, Radio Link Control (RLC) processor, Packet Data Convergence Protocol (PDCP) processor, Media Access Control (MAC) processor, Residential Gateway (R-GW), Set-Top Box (STB), Dynamic Host Control Protocol (DHCP) server, Network Address Translation (NAT) firewall, Border Controller (BC), Load Balancer (LB), media server, and network accelerator.

TECHNICAL OVERVIEW

A computer system transitions a virtual machine from a host computer to a target computer having a security key. The host computer transfers a security phrase to the target computer. The target computer applies the security key to the security phrase to generate a security response. That target computer transfers the security response to the host computer. The host computer determines whether the target computer can support the virtual machine based on the security response from the target computer. If the target computer is capable of supporting the virtual machine, then the host computer initiates a transition of the virtual machine from the host computer to the target computer. The determination of whether the target computer can support the virtual machine may be further based on resource availability, time-slice availability, and the other virtual machines executing on the target computer.

BRIEF DESCRIPTION OF THE DRAWINGS

FIG. 4 illustrates a data structure for transitioning virtual machines between hypervisors based on security requirements of the virtual machines.

DETAILED DESCRIPTION

Figure 1:
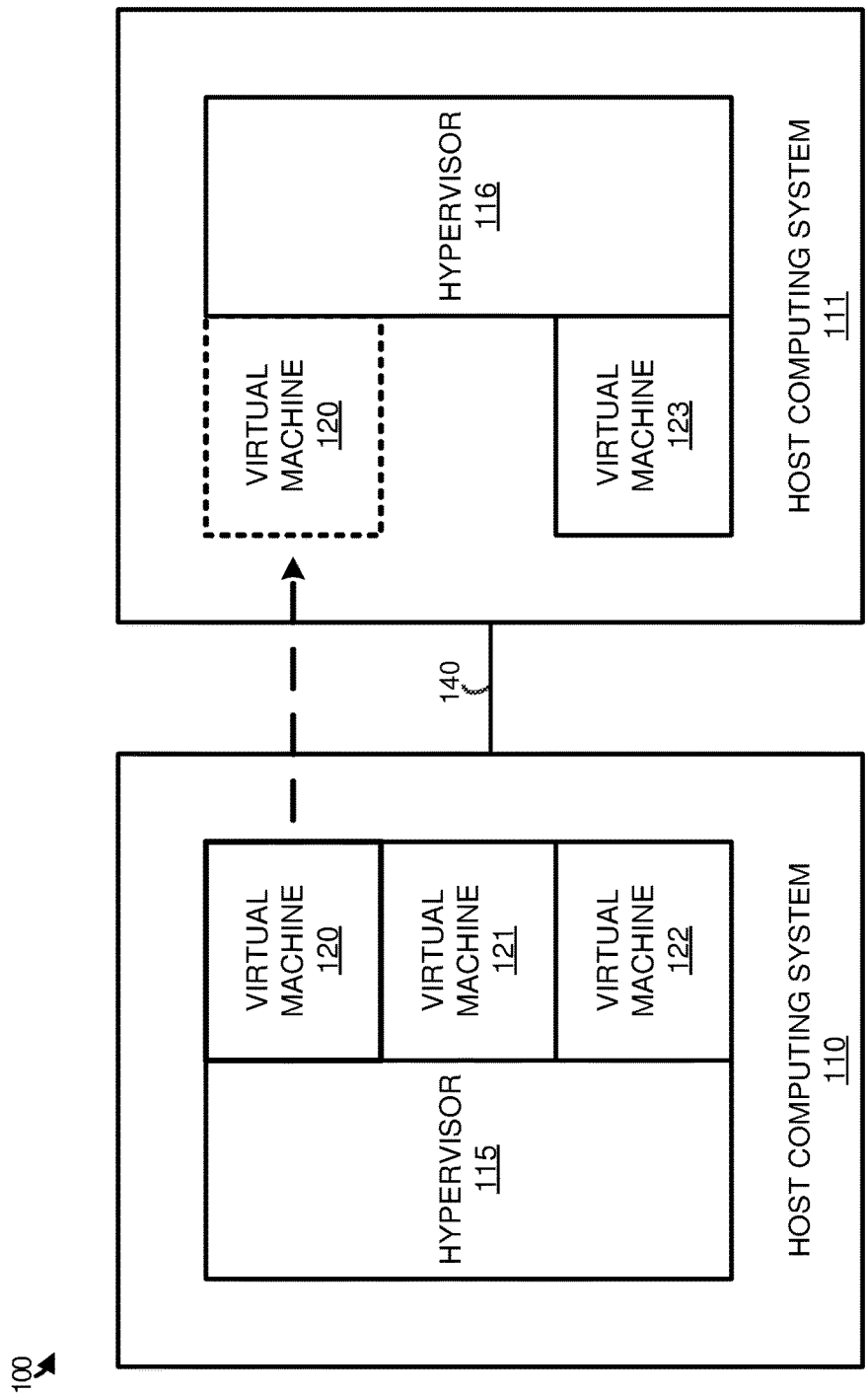
FIG. 1 illustrates a computing environment to transition virtual machines between hypervisors based on security requirements of the virtual machines.

FIG. 1 illustrates a computing environment 100 to transition virtual machines between hypervisors based on security requirements of the virtual machines. Computing environment 100 includes host computing systems 110-111, which further comprises hypervisors 115-116 and virtual machines 120-123. Host computing systems 110-111 communicate over communication link 140. Host computing systems 110-111 may each comprise a server computer, desktop computer, laptop computer, or any other similar computing system capable of executing virtual machines 120-123 and hypervisors 115-116, including combinations thereof. Host computing systems 110-111 may each include processing systems, storage systems, communication interfaces, user interfaces, and other similar computing hardware. Communication link 140 may use metal, glass, optical, air, space, or some other material as the transport media. Communication link may use Time Division Multiplex (TDM), asynchronous transfer mode (ATM), IP, Ethernet, synchronous optical networking (SONET), hybrid fiber-coax (HFC), circuit-switched, communication signaling, wireless communications, or some other communication format, including improvements thereof.

In operation, hypervisors 115-116, which may comprise software or firmware, provide a platform from which virtual machines 120-123 can execute. In particular, hypervisors 115-116 may abstract the components of host computing systems 110-111 and provide virtual hardware to the virtual machines. This virtual hardware may include processing systems, storage systems, communication interfaces, user interfaces, and other similar virtually represented hardware that may or may not reflect the physical hardware of host computing systems 110-111. Each virtual machine of virtual machines 120-123 may include an operating system, applications, and other processes to provide a particular operation.

In some implementations, virtual machines 120-123 may comprise virtual network elements that forward data communication packets for user data services. For example, host computing system 110-111 may be used to provide wireless communication services to a plurality of end user devices. To provide the services various gateways, routers, and control systems may be used to route and provide the required communications. Here, rather than providing the gateway, routers, and control systems on separate computing systems, host computing systems 110-111 allow the various network elements to share the resources of an underlying computing system. These resources may include time slices for processing, processing cores, memory, and other similar resources of the underlying computing system.

Although each of the virtual machines may share the resources of a host computing system, each of the virtual machines may be required to migrate to an alternative hypervisor or host to provide a desired operation. For example, virtual machines may migrate because the host machine requires an update, because another physical machine would provide better support for the operation of the virtual machine, because a new host machine has become available, or for any other reason. Prior to migrating a virtual machine, security requirements for the virtual machine are determined, and compared against the security characteristics that can be provided by the new hypervisor and host machine. For example, a virtual machine may require a certain time slice configuration, processing core resources, memory resources, or other similar resources from the host computing system. Further, the virtual machine may require that only particular virtual machines can be co-executing on the same host computing system or hypervisor. For instance, a virtual machine may require that all other virtual machines on the hypervisor belong to the same data service.

In addition to determining the requirements for the virtual machine, hypervisor 115 may inquire hypervisor 116 to determine if the security requirements are met for migrating the virtual machine. If the requirements are not met, then hypervisor 115 may refuse to migrate the virtual machine and, in some examples, may generate a notification for an administrator that the migration of the virtual machine has failed. In contrast, if the hypervisor does provide the necessary security and resources for the virtual machine, then hypervisor 115 may initiate a migration of the virtual machine from first hypervisor 115 to second hypervisor 116.

Figure 2:
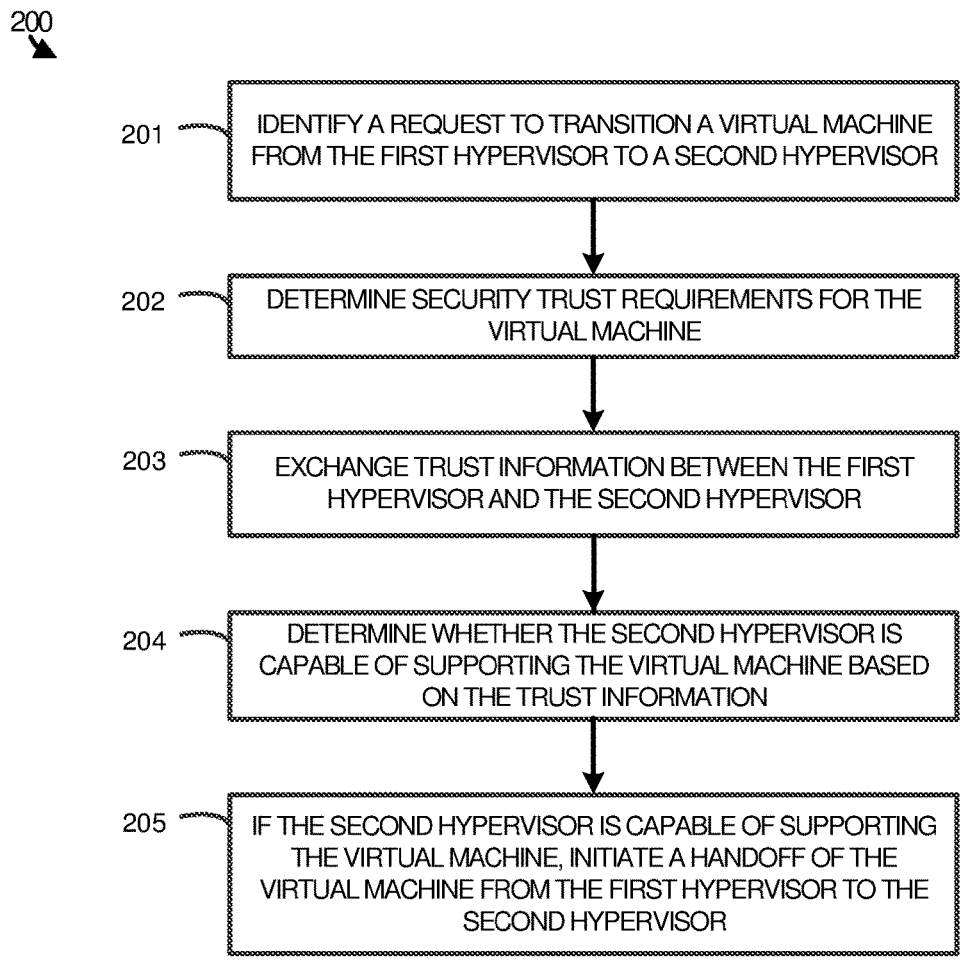
FIG. 2 illustrates a method of operating a hypervisor to transition a virtual machine between hypervisors based on security requirements of the virtual machine.

FIG. 2 illustrates a method 200 of operating hypervisor 115 to transition virtual machine 120 between hypervisors based on security requirements of the virtual machine. The operations of FIG. 2 are referenced parenthetically in the description below. As described in FIG. 1, virtual machines may require transitions between hypervisors and host computing systems for a variety of purposes, including, but not limited to, the current host computing system requiring an update, the initiation of a new host computing system, or the new host computing system providing a better platform for the virtual machine operations.

In the present example, hypervisor 115 identifies a request to transition virtual machine 120 from hypervisor 115 to hypervisor 116 (201). Although illustrated separate in the present example, it should be understood that hypervisor 115 and hypervisor 116 might reside on the same host computing system. In some examples, the notification to transition hypervisors may be generated by an administrator on host computing system 110 or at an administration console communicatively coupled to host computing system 110. However, in other implementations, the request for transitioning the virtual machine to an alternative hypervisor may be generated by an automated process, such as a process that allocates the virtual machines across multiple computing systems and hypervisors.

In response to the request to transition virtual machine 110, hypervisor 115 determines security trust requirements for virtual machine 110 (202). In some implementations, hypervisor 115 may inquire virtual machine 110 for the trust requirements, but may also inquire a database or data structure that stores the security information for the virtual machine. The security requirements may include resource availability requirements, including time slice requirements, processing core availability requirements, memory availability requirements, or any other similar resource availability requirements. In addition to or in place of the resource availability requirements, the security trust requirements may include information about the other virtual machines that are executing on the new host computing system. Referring to FIG. 1, virtual machine 120 may require that all virtual machines executing on the same hypervisor belong to the same data service. Accordingly, if virtual machine 120 provided the operations of a packet data network gateway, virtual machine 123 may be required to provide serving gateway operations, router operations, or other similar operations for the same data service associated with virtual machine 120.

In addition to determining the security trust requirements for virtual machine 120, trust information is exchanged between hypervisor 115 and hypervisor 116 (203). In some implementations, hypervisor 115 may query hypervisor 116 for trust information related to the current operations of virtual machines executing on hypervisor 116. This trust information may include information about the number of cores available to provide to virtual machine 120, the time slices that could be provided to virtual machine 120, the amount of memory that could be provided to virtual machine 120, the types and/or operations of virtual machines currently executing on hypervisor 116, or any other similar information related to the security trust requirements of virtual machine 120.

In some implementations, the exchange of trust information between hypervisor 115 and hypervisor 116 may include an exchange of passphrases or hashes that can be used to verify hypervisor 116, host computing system 111, and the other virtual machines executing on hypervisor 116. For example, hypervisor 115 may provide one or more passphrases or hashes to hypervisor 116. In response to receiving the hashes, hypervisor 116 or a related security module on host computing system 111 may apply one or more keys to the passphrases to generate response phrases that can then be transferred back to hypervisor 115. Once received at hypervisor 115, hypervisor 115 may compare the response phrases with expected results to determine if the new hypervisor and/or host computing system is capable of supporting the transition of the virtual machine.

In some examples, host computing system 110 and host computing system 111 may implement trust modules, such as Roots of Trust (RoT), not illustrated in FIG. 1, that are capable of verifying the virtual machines and hypervisors on the host computing systems. Roots of Trust are a set of functions in a separate trusted computing module on the host computing systems, which serve as separate computing processes that control the trust operations for the computing system. For example, to generate the hash between hypervisor 115 and hypervisor 116, the Roots of Trust may generate a particular hash or phrase to be provided to hypervisor 116. In response to the phrase, hypervisor 116 may call a Root of Trust module on host computing system 111 to apply a key to the provided phrase, and generate a response phrase. The response phrase from the Root of Trust module on host computing system 111, may be provided to hypervisor 115 and the Root of Trust module on host computing system 110. The response phrase may then be compared by the Root of Trust module on host computing system 110 to an expected result, determining if host computing system 111 is capable of supporting the transition of the virtual machine.

After the exchanging the trust information between the hypervisors, hypervisor 115 determines whether hypervisor 116 is capable of supporting virtual machine 120 based on the exchanged trust information and the security trust requirements for virtual machine 120 (204). In some implementations, at least a portion of the retrieved information from hypervisor 116 may be compared to a data structure containing the requirements for virtual machine 120. If hypervisor 116 is capable of supporting virtual machine 120, hypervisor 115 may initiate a handoff of virtual machine 120 from hypervisor 115 to hypervisor 116 (205). This handoff may include ceasing execution of virtual machine 120 on hypervisor 115, and initiating execution of virtual machine 120 on hypervisor 116.

Although illustrated on separate host computing systems in the present example, it should be understood that hypervisors 115-116 may reside on the same host computing system in some implementations. Further, despite not being illustrated in the example of FIG. 1, it should be understood that a management system or console may be used to manage the various host computing systems and virtual machines within the computing environment. In this configuration, the management console may initiate the transition of a virtual machine from the first hypervisor to a second hypervisor, as well as provide a variety of other management operations.

Figure 3:
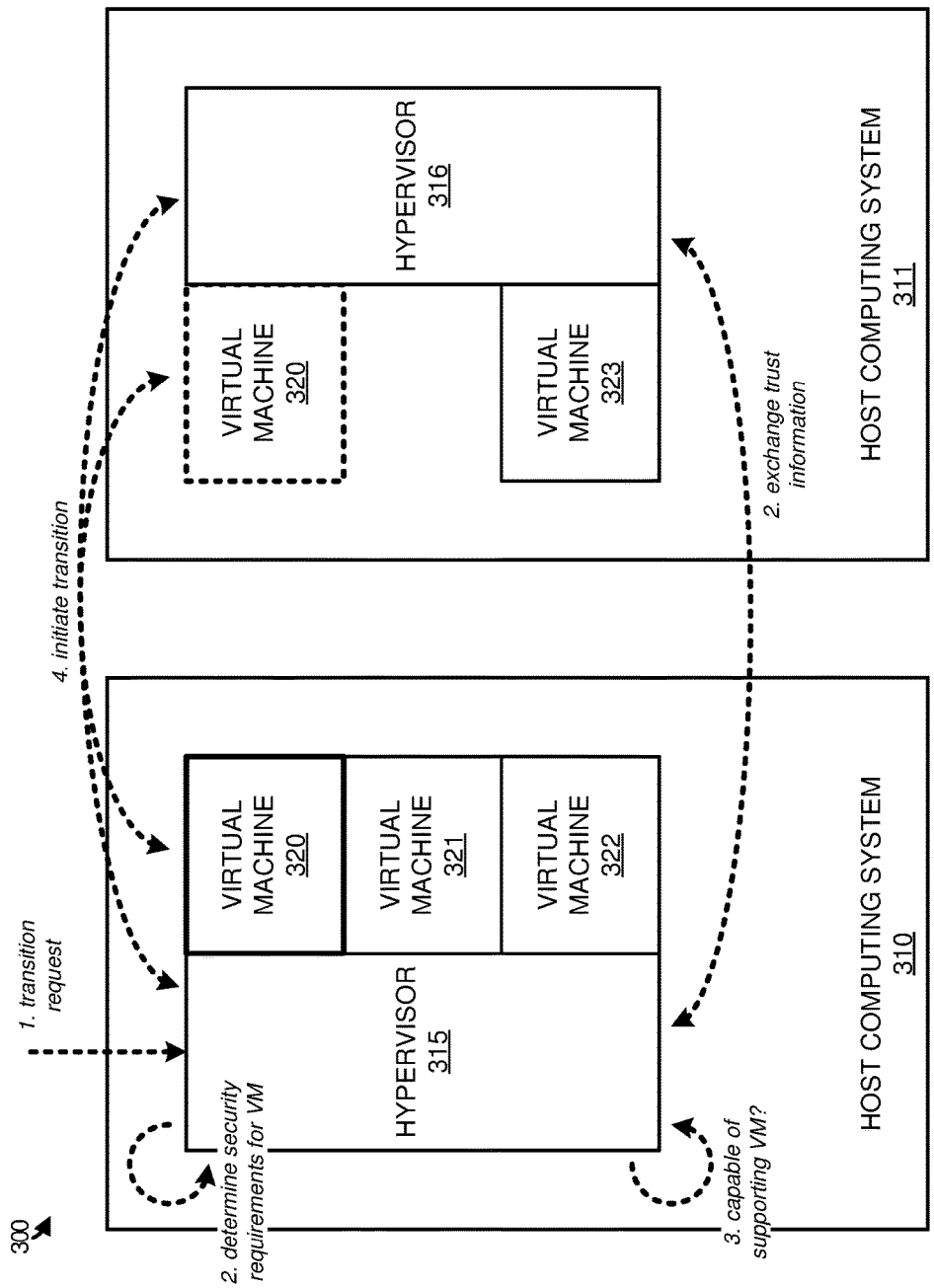
FIG. 3 illustrates an operational scenario of transitioning a virtual machine between hypervisors based on security requirements of the virtual machine.

FIG. 3 illustrates an operational scenario 300 of transitioning a virtual machine between hypervisors based on security requirements of the virtual machine. Operational scenario 300 includes host computing systems 310-311, and hypervisors 315-316 that provide a platform for virtual machines 320-323.

As illustrated, a transition request is initiated for virtual machine 320 to transition from host computing system 310 and hypervisor 315 to host computing system 311 and hypervisor 316. This transition request may be initiated by an administrator on host computing system 310, by an administrator at an administration console communicatively coupled to host computing system 310, or by an automated process either locally on host computing system 310 or on a management system external to host computing system 310. In response to the request, hypervisor 315 determines security trust requirements for virtual machine 320. These security trust requirements may include operational requirements for host computing system 311, including processing resource requirements for virtual machine 320, memory resource requirements for virtual machine 320, time slice requirements for virtual machine 320, amongst other similar requirements. Further, the security trust requirements may include requirements for other virtual machines that would also be executing on host computing system 311 and hypervisor 316. These other virtual machine requirements may include requirements that the virtual machines provide certain operations, the virtual machines belong to a particular service or network, the virtual machines do not belong to a particular service or network, or other similar virtual machine requirements. For example, virtual machine 320 may comprise a virtual network element that forwards data packets for a data service. Accordingly, virtual machine 320 may require that all virtual machines executing on the same hypervisor belong to the same data service.

In addition to determining the trust requirements for virtual machine 320, hypervisor 315 exchanges trust information with destination hypervisor 316. This trust information corresponds to the security trust requirements for the virtual machine. Accordingly, hypervisor 315 may retrieve or obtain information about the available processing resources, memory resources, time slices, and other similar availability information. Hypervisor 315 may further obtain information about the other virtual machines currently executing on hypervisor 316, including information about virtual machine 323, such as the current operations of virtual machine 323, the type of data service associated with virtual machine 323, or any other similar information.

In some implementations, the trust requirements for virtual machine 320 may require that host computing system 310 and hypervisor 315 verify, or established trust with, host computing system 311 and hypervisor 316 before a handoff process can be initiated for the virtual machine. To verify host computing system 311 and hypervisor 316, Root of Trust modules or other similar trust modules located on host computing systems 310-311 may be used to exchange at least a portion of the trust information between the systems. For example, to verify the machine, a Root of Trust module on host computing system 310 will generate, using a random value generator, a time based generator, or some other phrase generator, and transfer a phrase to host computing system 311. In response to receiving the phrase, a second Root of Trust module located on host computing system 311 may apply a key to the phrase and send a response to host computing system 310. Once received, host computing system 310 may compare the response to an expected value to determine if host computing system 311 and hypervisor 316 can be trusted for the virtual machine. In some implementations, in addition to or in place of verifying the host computing system and the hypervisor, the trust modules may be used to transfer encrypted trust information from host computing system 311 to host computing system 310. Once transferred and received at host computing system 310, local trust modules on host computing system 310 may decrypt the provided trust information, which may include information about resources available to the new virtual machine, information about other virtual machines executing on the hypervisor, or any other similar information.

After the trust information is exchanged with hypervisor 316 and host computing system 311, hypervisor 315 determines whether hypervisor 316 and host computing system 311 are capable of supporting the virtual machine. If they are not capable of supporting the virtual machine, then hypervisor 315 may prevent the transition of the virtual machine to host computing system 311. However, if hypervisor 316 is approved to support the virtual machine, as is illustrated in FIG. 3, then a process may be initiated to transition virtual machine 320 from hypervisor 315 to hypervisor 316. This process may include terminating the virtual machine on hypervisor 315 and initiating the virtual machine on hypervisor 316.

FIG. 4 illustrates a data structure 400 for transitioning virtual machines between hypervisors based on security requirements of the virtual machines. Data structure 400 includes virtual machines 410 and trust requirements 420-

421, which include requirements 431-438. Data structure 400 may be stored on a host computing system, on an external resource, or in any other storage location accessible by a hypervisor that provides a platform to virtual machines (VMs) 411-414.

In operation, virtual machines may require migration from a first hypervisor to a second hypervisor for a variety of purposes. To migrate a virtual machine, the hypervisor providing the platform for the virtual machine may ensure that the new host and hypervisor includes the required security for the currently executing virtual machine. For example, if virtual machine 411 were identified to be transitioned, requirement 431 and requirement 435 may be recognized by the hypervisor as security pre-requisites for migrating the virtual machine. Once the requisites are identified, and security information is exchanged with the destination hypervisor, the current hypervisor may compare the retrieved security information with the security trust requirements in data structure 400 to determine if a handoff operation is permitted for the virtual machine. Referring to the previous example of virtual machine 411, if the retrieved security information meets requirement 431 and requirement 435, a handoff process may be initiated for virtual machine 411.

In some implementations, a large number of security exchanges between the hypervisors and computing systems of an environment may be burdensome on the communication interfaces and processing systems of the host computing systems. Accordingly, when there is a large amount of traffic or when quicker virtual machine migrations are preferred, changes may be made to the security information exchanges. These changes to the security information exchanges may be automated based on the number of migrations required, or may be specified by an administrator of the computing environment. For example, an administrator may specify that the security requirement checks between hypervisors should be eliminated to reduce the overhead associated with verifying hypervisors to support virtual machines. Accordingly, rather than exchanging the security information between hypervisors, the security verification step may be skipped, and the handoff process may be immediately initiated.

Figure 5:
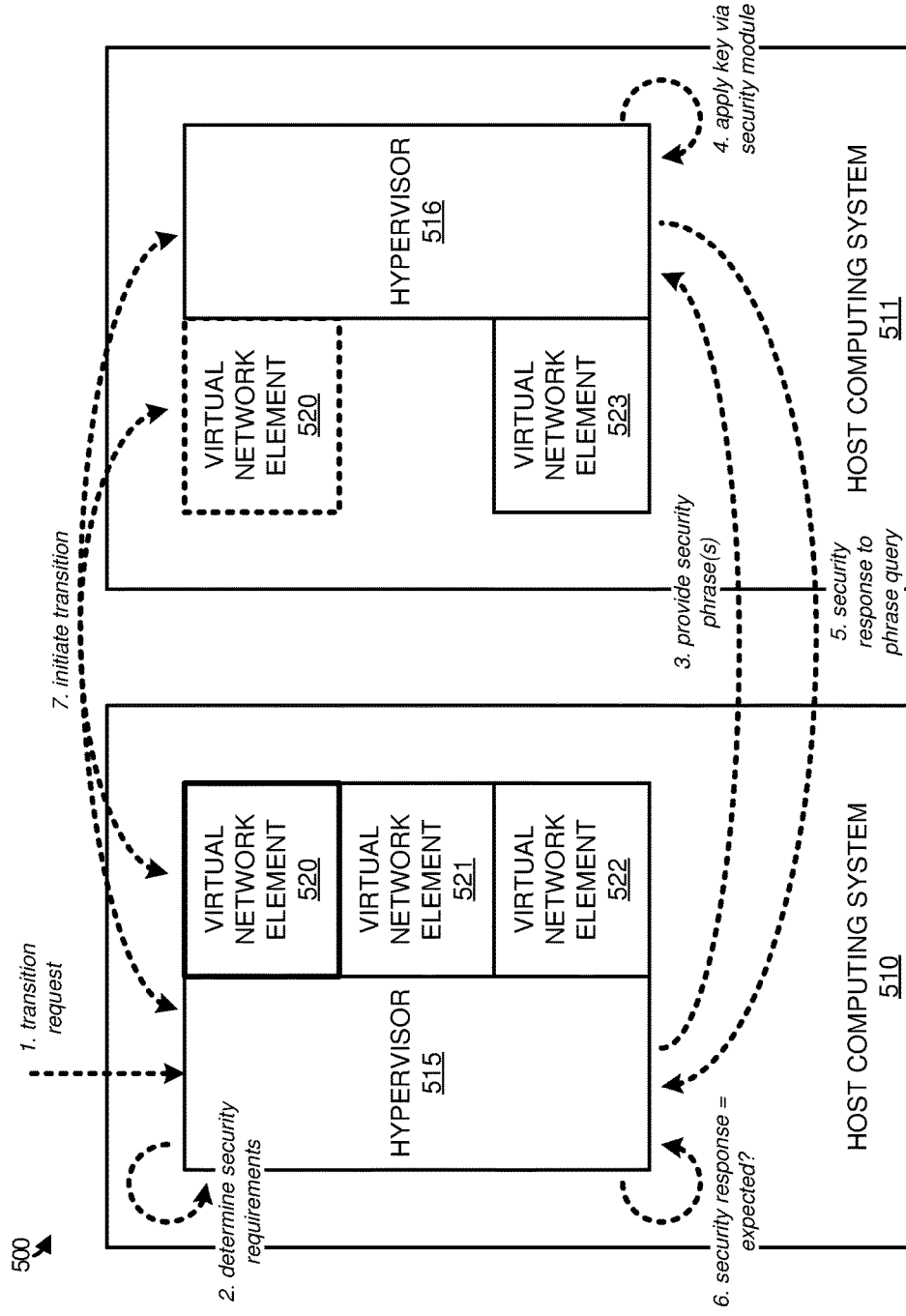
FIG. 5 illustrates a computing environment to transition virtual network elements from a first host computing system to a second host computing system.

FIG. 5 illustrates a computing environment 500 to transition virtual network elements from a first host computing system to a second host computing system. Computing environment 500 includes host computing systems 510-511 and hypervisors 515-516 that provide a platform for virtual network elements 520-523. Virtual network elements 520-523 are configured to forward data packets for a data service, such as a Long Term Evolution communication service. Virtual network elements 520-523 may comprise gateways and routers for the data service, and may further comprise control systems, such mobility management entities for the data service.

In operation, virtual network elements 520-523 are deployed on host computing systems 510-511 to provide data services for connecting end user devices. During execution on the hypervisors, an administrator or an automated process may determine that virtual network element 520 requires a handoff from a hypervisor 515 to hypervisor 516. This determination may be made directly on host computing system 510, or may be registered via an administration console communicatively coupled to the host computing system.

In response to transition request for virtual network element 520, hypervisor 515 determines security requirements for virtual network element 520. These security requirements include, but are not limited to, processing and memory resources that are required for the network element, verification of the new host computing system, or requirements for the co-executing virtual machines on the new host computing system. Here, hypervisor 515 is required to verify host computing system 511 and hypervisor 516 to support virtual network element 520. To verify the new system for virtual network element, a security software module, such as a Root of Trust module on host computing system 510 may generate a security phrase and transfer the phrase to host computing system 511. Once received, hypervisor 511 may use a security software module located on the system to generate a response phrase, and transfer the response phrase to host computing system 510. Once received, hypervisor 515 with the assistance of the security software module may compare the response phrase to an expected result. If the response phrase does not match the expected result, hypervisor 515 may refuse the handoff to hypervisor 516. However, if the response phrase does match the expected result, hypervisor 515 may initiate a handoff process to hypervisor 516 and host computing system 511. This handoff process may include ceasing execution of virtual network element on hypervisor 515, and initiating execution of the virtual network element on hypervisor 516. The process may also include, in some implementations, a transfer of the virtual volume containing the virtual network element data to host computing system 511, wherein the virtual volume may comprise a virtual machine disk (VMDK), a virtual hard disk (VHD), or any other similar virtual volume file or files.

Although illustrated in the present example as exchanging phrases to verify the computing system and the hypervisor, it should be understood that other data and information may be exchanged between the hosts and hypervisors. For example, to determine the security trust information, hypervisor 515 may request and receive various operational information from hypervisor 516 and host 511. This information may include reports about available processing resources for virtual network element, memory resources for virtual network element, information about other virtual machines executing on the host computing system, or any other similar information. Once received from host computing system 511, hypervisor 515 may compare the received data with the trust requirements for the virtual machine to determine whether to allow the transfer of virtual network element 520.

As an example, virtual network element 520 may require that co-executing virtual network elements on the same host computing system belong to the same data service. Accordingly, hypervisor 516 may provide hypervisor 515 with information corresponding to the operations of virtual network element 523. If virtual network element 523 belonged to a second data service different from the data service for virtual network element 520, then virtual network element 520 may be prevented from migrating to host computing system 511. In contrast, if the operational information from hypervisor 516 indicated that virtual network element 523 corresponded to the same data service, then hypervisor 515 may initiate the handoff process for virtual network element 520.

Although illustrated in FIGS. 1-5 as using a hypervisor to determine whether to handoff a virtual machine between hypervisors, it should be understood that other processes executing on the host computing systems may assist in determining whether to handoff a virtual machine. For example, one or more software modules on a host computing system may be used to identify the transition request for the virtual machine, determine security trust requirements for the virtual machine, or any other similar process described herein. Further, in some implementations, the operations described herein may be implemented at least partially by a hypervisor manager for the computing environment. Referring to the example of FIG. 1, a hypervisor manager, which may be a separate computing system communicatively coupled to host computing systems 110-111, may be configured to identify a request to transition virtual machine 120 from hypervisor 115 to hypervisor 116, identify security trust requirements for virtual machine 120, and identify at least a portion of the security information from hypervisor 116. Accordingly, rather than providing all of the handoff operations within the host computing systems, at least a portion of the handoff determination operations may be initiated or executed within a hypervisor manager.

Figure 6:
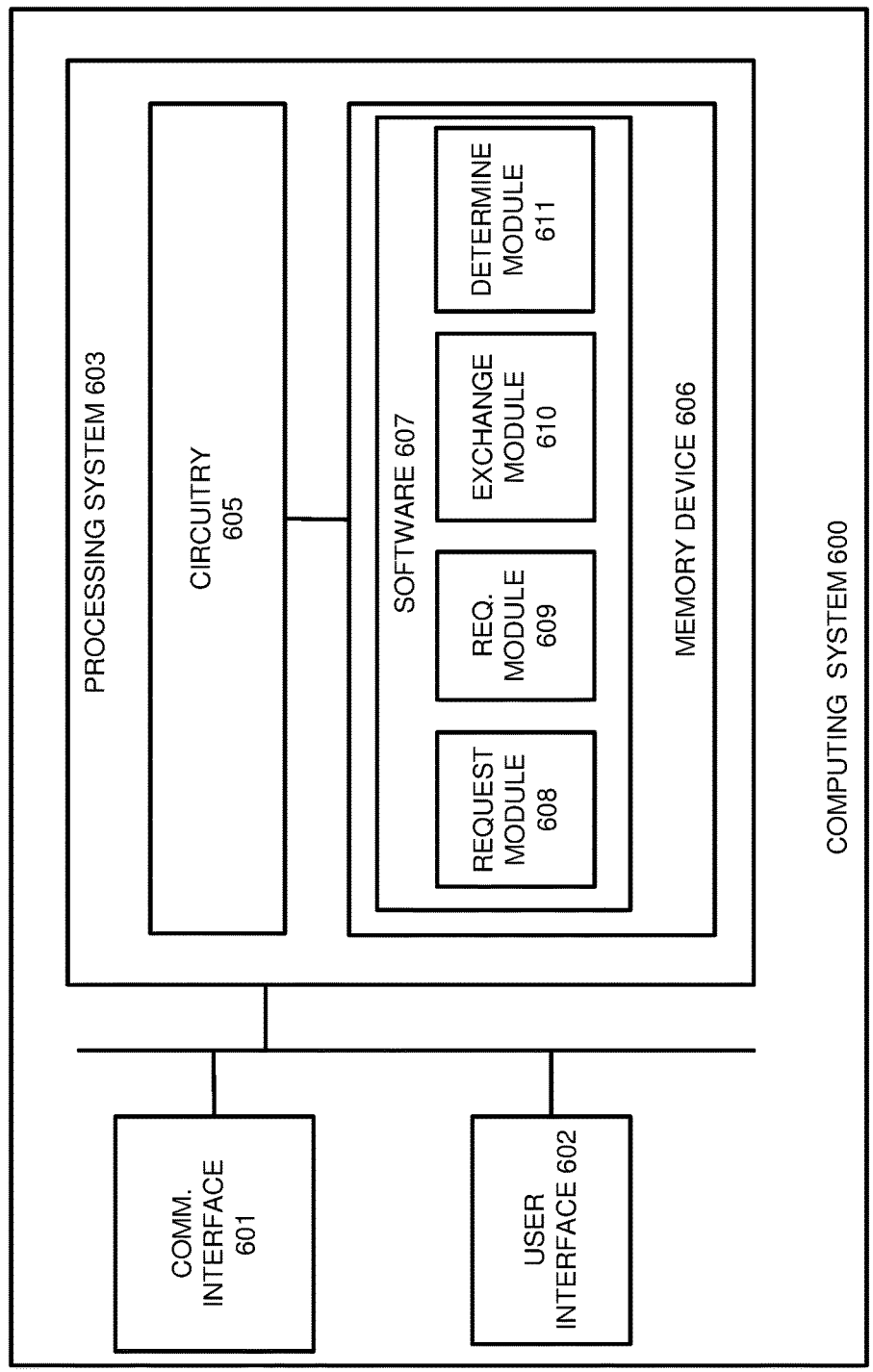
FIG. 6 illustrates a computing system capable of transitioning a virtual machine from a first hypervisor to a second hypervisor.

FIG. 6 illustrates a computing system 600 capable of transitioning a virtual machine from a first hypervisor to a second hypervisor. Computing system 600 is representative of any computing system or systems with which the various operational architectures, processes, scenarios, and sequences disclosed herein for transitioning virtual machines may be implemented. Computing system 600 is an example of host computing systems 110, 310, and 510, although it should be understood that other examples may exist. Computing system 600 comprises communication interface 601, user interface 602, and processing system 603. Processing system 603 is linked to communication interface 601 and user interface 602. Processing system 603 includes processing circuitry 605 and memory device 606 that stores operating software 607. Computing system 600 may include other well-known components such as a battery and enclosure that are not shown for clarity. Computing system 600 may be a personal computer, server, or some other computing apparatus—including combinations thereof.

Communication interface 601 comprises components that communicate over communication links, such as network cards, ports, radio frequency (RF) transceivers, processing circuitry and software, or some other communication devices. Communication interface 601 may be configured to communicate over metallic, wireless, or optical links. Communication interface 601 may be configured to use Time Division Multiplex (TDM), Internet Protocol (IP), Ethernet, optical networking, wireless protocols, communication signaling, or some other communication format—including combinations thereof. In some implementations, communication interface 601 may be configured to communicate with one or more host computing systems capable of hosting virtual machines.

User interface 602 comprises components that interact with a user to receive user inputs and to present media and/or information. User interface 602 may include a speaker, microphone, buttons, lights, display screen, touch screen, touch pad, scroll wheel, communication port, or some other user input/output apparatus—including combinations thereof. User interface 602 may be omitted in some examples.

Processing circuitry 605 comprises microprocessor and other circuitry that retrieves and executes operating software 607 from memory device 606. Memory device 606 comprises a non-transitory storage medium, such as a disk drive, flash drive, data storage circuitry, or some other memory apparatus. Processing circuitry 605 is typically mounted on a circuit board that may also hold memory device 606 and portions of communication interface 601 and user interface 602. Operating software 607 comprises computer programs, firmware, or some other form of machine-readable processing instructions. Operating software 607 includes request module 608, requirement (req) module 609, exchange module 610, and determine module 611, although any number of software modules may provide the same operation. Operating software 607 may further include an operating system, utilities, drivers, network interfaces, applications, or some other type of software. Although not illustrated in the present example, it should be understood that software 607 may include at least one hypervisor configured to provide a platform for one or more executing virtual machines. When executed by processing circuitry 605, operating software 607 directs processing system 603 to operate computing system 600 as described herein.

In particular, request module 608, when executed by processing system 603, directs processing system 603 to identify a request for to handoff a virtual machine from a first hypervisor to a second hypervisor. In response to the request to handoff the virtual machine, requirement module 609 directs processing system 603 to determine security trust requirements for the virtual machine. These security trust requirements may include resources requirements for the virtual machine, such as processing resources for the virtual machine, memory resources for the virtual machine, time slice resource requirements, or any other similar requirement. Further, the security trust requirements may include requirements for other processes and virtual machines executing on destination host computing system. For example, a virtual machine may require all virtual machines executing on a host computing system to represent network elements for the same data service.

In addition to determining the security requirements for the virtual machine associated with the handoff request, exchange module 610 is configured to exchange trust information with the destination host computing system and/or hypervisor. In particular, exchange module 610 may be configured to retrieve various security information from the destination host and hypervisor, including the processing support that can be provided to the virtual machine, the memory that can be allocated to the virtual machine, the time slices that could be provided to the virtual machine, or information about other virtual machines executing via the destination hypervisor. In addition to or in place of the previously mentioned security information, in some implementations, computing system 600 may be configured to exchange one or more hashes or security phrases that can be used to verify the destination hypervisor and computing system.

Once the trust information is exchanged between the computing system 600 and the destination computing system and hypervisor, determine module 611 directs processing system 603 to determine whether the destination hypervisor is capable of supporting the handoff of the virtual machine. If the destination hypervisor is incapable of providing the required security for the virtual machine, the computing system 600 may prevent the handoff of the virtual machine. However, if the destination hypervisor is capable of supporting the virtual machine, determine module 611 may direct processing system 603 to initiate a handoff process of the virtual machine to the destination hypervisor. In some implementations, this may include ceasing execution of the virtual machine on computing system 600 and directing the destination hypervisor to initiate execution of the virtual machine.

In some implementations, the virtual machines that are executing on computing system 600 comprise virtual network elements configured to provide a data service to one or more end user devices. These virtual network elements may provide gateways, routers, and other control functions within a data network, such as a Long Term Evolution (LTE) network. As a result, in some examples, the security trust requirements for the virtual machines may correspond to the data service with which the virtual network elements belong. As an illustrative example, the virtual machine to be transitioned from computing system 600 may belong to a first data service, and may be associated with a trust requirement that requires all other virtual machines on the same hypervisor to belong to the first data service. Consequently, if a handoff request were initiated to a hypervisor executing a second virtual network element associated with a second data service, computing system 600 may refuse to handoff the device.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of transitioning a virtual machine from a host computer to a target computer having a security key, the method comprising:
    the host computer transferring a security phrase to the target computer;
    the target computer applying the security key to the security phrase to generate a security response and transferring the security response to the host computer;
    the host computer determining whether the target computer supports the virtual machine based on the security response from the target computer, and if the target computer is capable of supporting the virtual machine, then the host computer initiating a transition of the virtual machine from the host computer to the target computer, wherein the target computer applying the security key to the security phrase to generate the security response comprises a hypervisor in the target computer applying the security key to the security phrase to generate the security response;
    the host computer transferring a time-slice request to the target computer to identify a time-slice for the virtual machine on the target computer;
    the target computer transferring a time-slice response to the host computer that identifies the time-slice for the virtual machine on the target computer; and
    the host computer determining whether the target computer supports the virtual machine further comprises determining whether the target computer supports the virtual machine based on the time-slice for the virtual machine on the target computer.

2. The method of claim 1 wherein the host computer transferring a security phrase to the target computer comprises the host computer transferring the security phrase to a hypervisor in the target computer.

3. The method of claim 1 wherein the target computer transferring the security response to the host computer comprises a hypervisor in the target computer transferring the security response to the host computer.

4. The method of claim 1 wherein the host computer initiating the transition of the virtual machine to the target computer comprises the host computer initiating the transition of the virtual machine to a hypervisor in the target computer.

5. The method of claim 1 wherein the host computer determining whether the target computer supports the virtual machine comprises a hypervisor in the host computer determining whether the target computer supports the virtual machine.

6. The method of claim 1 further comprising:
    the host computer transferring a processing resource availability request to the target computer;
    the target computer transferring a processing resource availability response to the host computer; and
    the host computer determining whether the target computer supports the virtual machine further comprises determining whether the target computer supports the virtual machine based on the processing resource availability response from the target computer.

7. The method of claim 1 further comprising:
    the host computer transferring a memory resource availability request to the target computer;
    the target computer transferring a memory resource availability response to the host computer; and
    the host computer determining whether the target computer supports the virtual machine further comprises determining whether the target computer supports the virtual machine based on the memory resource availability response from the target computer.

8. The method of claim 1 further comprising:
    the host computer transferring a virtual machine request to the target computer to identify executing virtual machines on the target computer;
    the target computer transferring a virtual machine response to the host computer that identifies the executing virtual machines on the target computer; and
    the host computer determining whether the target computer supports the virtual machine further comprises determining whether the target computer supports the virtual machine based on the executing virtual machines on the target computer.

9. A computer system to transition a virtual machine from a host computer to a target computer having a security key, the computer system comprising:
    the host computer transfers a security phrase to the target computer;
    the target computer applies the security key to the security phrase to generate a security response and transfer the security response to the host computer; and
    the host computer determines whether the target computer supports the virtual machine based on the security response from the target computer, and if the target computer is capable of supporting the virtual machine, then the host computer initiates a transition of the virtual machine from the host computer to the target computer, wherein a hypervisor in the target computer is applying the security key to the security phrase to generate the security response;
    the host computer is further transferring a time-slice request to the target computer to identify a time-slice for the virtual machine on the target computer;
    the target computer is further transferring a time-slice response to the host computer that identifies the time-slice for the virtual machine; and
    the host computer is further determining whether the target computer supports the virtual machine based on the time-slice for the virtual machine in the target computer.

10. The computer system of claim 9 wherein the host computer is configured to transfer a security phrase to a hypervisor in the target computer.

11. The computer system of claim 9 wherein a hypervisor in the target computer is configured to transfer the security response to the host computer.

12. The computer system of claim 9 wherein the host computer is configured to initiate the transition of the virtual machine to a hypervisor in the target computer.

13. The computer system of claim 9 wherein a hypervisor in the host computer determines whether the target computer supports the virtual machine.

14. The computer system of claim 9 wherein:
the host computer is further transferring a processing resource availability request to the target computer;
the target computer is further transferring a processing resource availability response to the host computer; and
the host computer is further determining whether the target computer supports the virtual machine based on the processing resource availability response from the target computer.

15. The computer system of claim 9 wherein:
the host computer is further transferring a memory resource availability request to the target computer;
the target computer is further transferring a memory resource availability response to the host computer; and
the host computer is further determining whether the target computer supports the virtual machine based on the memory resource availability response from the target computer.

16. The computer system of claim 9 wherein:
the host computer is further transferring a virtual machine request to the target computer to identify executing virtual machines on the target computer;
the target computer is further transferring a time-slice response to the host computer that identifies the executing virtual machines on the target computer; and
the host computer is further determining whether the target computer supports the virtual machine based on the executing virtual machines on the target computer.

* * * * *